Figure 1:
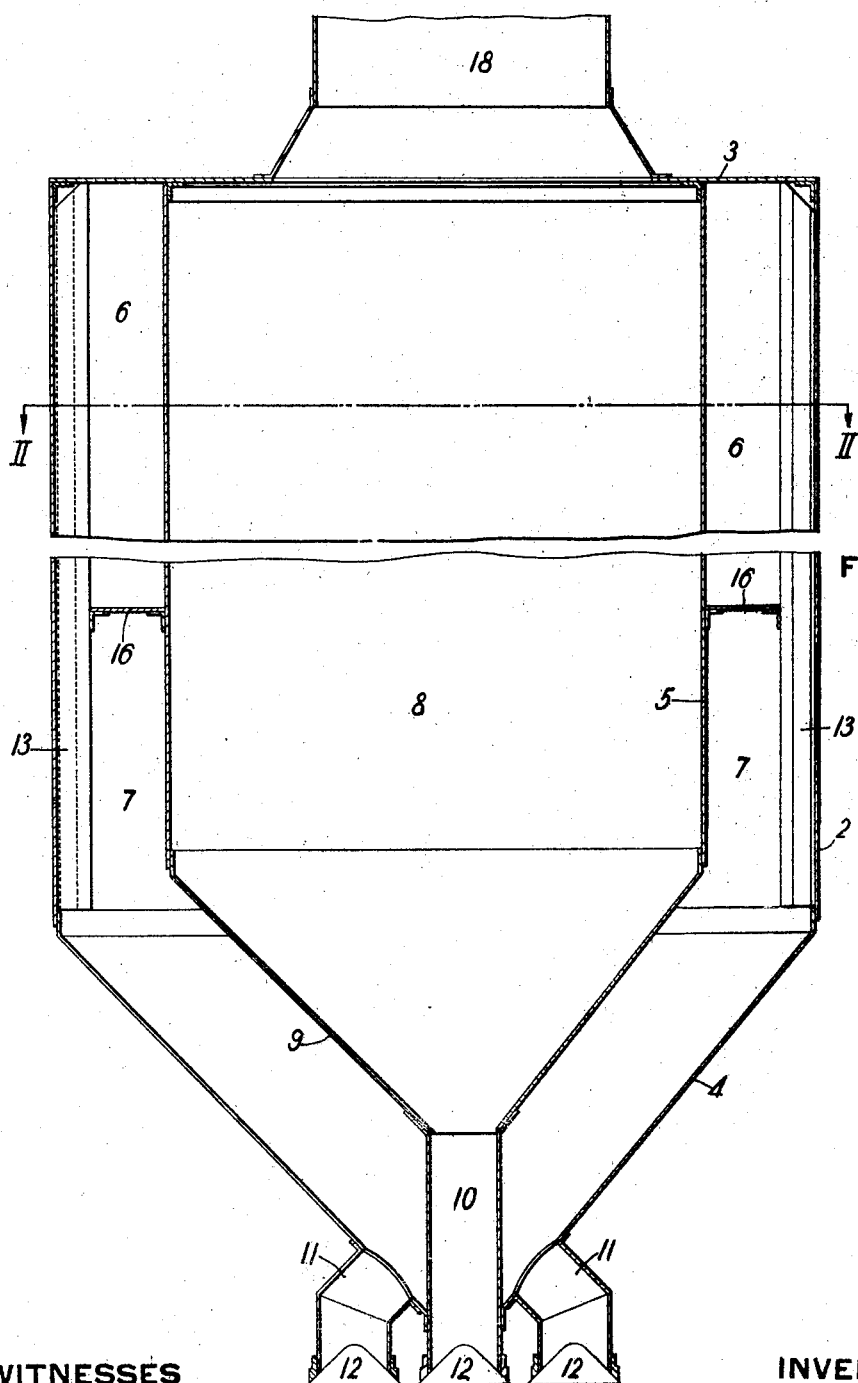

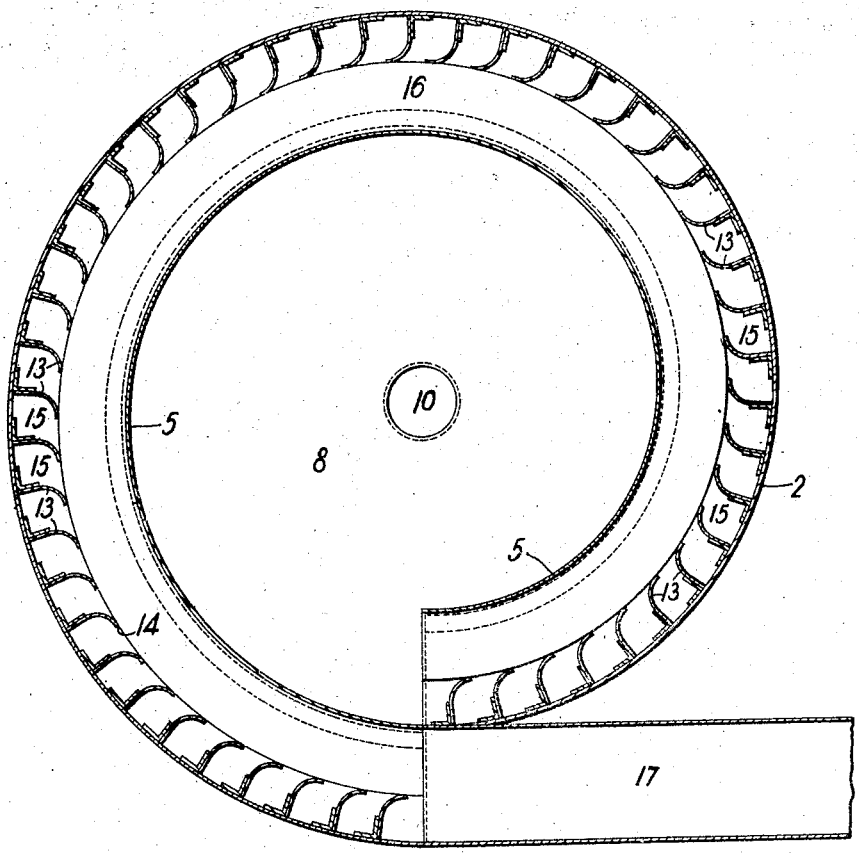

UNITED STATES PATENT OFFICE.

ARTHUR J. BOYNTON, OF LORAIN, OHIO.

DUST-CATCHER.

1,063,110.

Specification of Letters Patent.

Patented May 27, 1913.

Application filed May 2, 1912. Serial No. 694,723.

*To all whom it may concern:*

Be it known that I, ARTHUR J. BOYNTON, a citizen of the United States, residing at Lorain, in the county of Lorain and State of Ohio, have invented a new and useful Dust-Catcher, of which the following is a specification.

My invention relates to the construction and arrangement of dust catchers used to remove finely divided solids from gases, and more particularly to dry dust catchers used in removing flue dust and other finely divided solids from blast furnace and similar combustible gases.

One object of my invention is to provide a dust catcher having novel means whereby the course of the gases passing through the dust catcher is directed and controlled to effect a more complete separation of the gases and solids carried in suspension therein, by which separation of the solids from the gases when effected is maintained, and disturbance of the flue dust or solids deposited within the dust catcher by gases later sweeping over accumulated dust is avoided and prevented.

Another object of the invention is to provide a positively determined path for the gases of sufficient length to effectively separate the flue dust from the gases and in a manner preventing reëntry of dust deposited within the dust catcher into the current of gases after separation has taken place.

A further object of my invention is to provide a dust catcher having a series of baffles constructed and arranged in a novel manner whereby the efficiency of the baffles in removing the dust is largely increased and the dust collected thereby is caused to pass out of the path of the incoming gases.

Still further objects of my invention will appear as the invention is more fully described and claimed hereinafter.

Referring to the accompanying drawings forming part of this specification, Figure 1 is a sectional elevation showing a dust catcher constructed and arranged in accordance with my invention. Fig. 2 is a sectional plan of the same, the section being taken on the line II—II of Fig. 1.

In the drawings 2 designates the spiral outer shell of the dust catcher having a top 3 and a downwardly and inwardly sloping bottom 4, and 5 is a spiral partition which extends downwardly within the shell 2 from the top 3 of the dust catcher, so as to form the spiral chambers or compartments 6 and 7, and the inner chamber 8. The partition 5 has a downwardly and inwardly inclined or sloping bottom 9, the opening in the small end of the bottom 9 being connected to the tube 10 which forms a dust leg for the inner compartment 8. The sloping bottom 4 for the outer shell 2 of the dust catcher also is provided with branches 11 forming dust legs for the lower outer compartment 7 of the dust catcher. The dust legs 10 and 11 are normally closed by the movable sealing bells 12 engaging with the lower open ends of the dust legs, these bells being operatively mounted on the dust legs 10 and 11 to open and close in the usual known manner.

Secured on the inside of the shell 2 of the dust catcher is a series of curved plates forming baffles 13, the inner edges 14 of these baffles being curved to extend in a direction opposite to the direction of flow of the incoming gases. The baffles 13, with the shell 2, to which they are secured form, on the periphery of the chambers 6 and 7, a series of vertically extending channels 15, which have one side opening into the outer chambers 6 and 7.

At an intermediate point in the height of the dust catcher a horizontally extending partition 16 is provided, which is secured by one edge to the outer surface of the partition 5 and by the other edge to the curved inner edges of the baffles 13, so as to divide the space between the partition 5 and shell 2 into the upper and lower chambers or compartments 6 and 7. The so-formed chambers 6 and 7 are connected by the series of channels 15 formed by the adjacent baffles 13.

At the outer end of the spiral chamber 6 of the dust catcher the gas inlet 17 is located, this gas inlet being rectangular in cross section and of a height corresponding to the distance between the top 3 of the dust catcher and the partition 16. The opposite or inner end of the spiral compartment 6 opens into the inner compartment 8 formed by the partition, and the gas outlet opening 18 is located on the top 3 of the dust catcher, being connected into the middle compartment 8.

In the operation of my improved apparatus the incoming gases pass from the inlet main 17 into one end of the upper spiral compartment 6 and travel in a substantially horizontal direction around this compartment and finally entering the inner compartment 8 of the dust catcher, then rise upwardly in the compartment 8 and pass outwardly through the outlet main 18 on the top of the dust catcher. The gases in passing through the dust catcher are caused to travel through the spiral chamber 6 in a substantially horizontal direction and the solid particles contained in the gases will be thrown outwardly by centrifugal force into the channels 15 formed by the baffles 13. The horizontal direction of movement of the finely divided solid materials will be interrupted and changed by engagement with the baffles 13, and, by reason of their weight, such materials will then drop or fall vertically within the channels 15 formed by the baffles 13 and passing downwardly beyond the partition 16 will enter the dust chamber 7 and be delivered into one or another of the dust legs 11.

It will be readily seen that owing to the spiral arrangement of the chamber 6 the length of travel of the gases in a horizontal direction through the dust catcher is very largely increased, so that the removal of finely divided solids is effected more completely than has been possible with the dust catchers as constructed heretofore. The gases will continue their flow through the spiral chamber 6 and emerge therefrom at the inner end of the chamber 6 into the inner compartment 8. Solid materials deposited within the chamber 8 from the column of clean gases ascending therein and passing out of the chamber 8 into the gas outlet main 17 will be deposited within the vertical dust leg 10. The dust deposited in the chambers by the gases and collected in the dust legs 10 and 11 will be removed at intervals by lowering the sealing bells 9 on the lower ends of the dust legs.

The advantages of my invention will be apparent to those skilled in the art. By the peculiar construction of my gas washer the gases are caused to pass therethrough in a substantially horizontal path and the baffles will interrupt and change the direction of flow of the finely divided solids in the gases, causing the solids to fall vertically into the lower compartment, where they cannot be swept by the incoming gases so as to disturb the solids and cause their reëntry into the incoming gases.

Modifications in the construction and arrangement of the parts may be made without departing from my invention. The spiral compartments may be constructed to form a path of more or less than 360 degrees, as is shown in the drawings. The number and size of the baffles may be varied, and the location of the partition separating the chambers 6 and 7 may be raised or lowered as is found desirable or necessary, and other variations may be made within the scope of my invention as defined in the appended claims.

I claim:—

1. A dust catcher comprising an inner chamber, a plurality of outer chambers surrounding said inner chamber, said chambers having imperforate walls, at least one outer chamber forming a spiral having one end opening into the inner chamber, a gas inlet on the opposite end of said spiral chamber, a gas outlet on the inner chamber, and means forming openings connecting said outer chambers.

2. A dust catcher comprising an inner chamber, a plurality of outer chambers surrounding said inner chamber, said chambers having imperforate walls, at least one outer chamber forming a spiral having one end opening into the inner chamber, a gas inlet on the opposite end of said spiral chamber, a gas outlet on the inner chamber, and a series of baffles forming channels connecting said outer chambers.

3. A dust catcher comprising an inner chamber, a plurality of outer chambers, said chambers having imperforate walls, at least one outer chamber surrounding said inner chamber and forming a spiral having one end opening into the inner chamber, a gas inlet on the opposite end of said spiral chamber, a gas outlet on the inner chamber, and a series of curved baffles forming vertical channels connecting said outer chambers.

4. A dust catcher comprising an inner chamber having a gas outlet opening, a spiral outer chamber surrounding said inner chamber having a gas outlet opening into said inner chamber and a gas inlet connected with a source of gas supply, a dust chamber surrounding the inner chamber below said outer chamber, said chambers having imperforate walls, and means forming a plurality of channels connecting said outer chamber and the dust chamber.

5. A dust catcher comprising an inner chamber having a gas outlet opening, a spiral outer chamber surrounding said inner chamber having a gas outlet opening into said inner chamber and a gas inlet connected with a source of gas supply, a dust chamber surrounding the inner chamber below said outer chamber, said chambers having imperforate walls, and a series of baffles forming channels connecting the outer chamber and the dust chamber on the periphery of said chambers.

6. A dust catcher comprising an inner chamber having a gas outlet opening, a spiral outer chamber surrounding said inner chamber having a gas outlet opening into said inner chamber and a gas inlet connected with a source of gas supply, a dust chamber surrounding the inner chamber below said outer chamber, said chambers having imperforate walls, a series of baffles forming channels connecting the outer chamber and the dust chamber on the periphery of said chambers, and dust legs on the bottom of said inner chamber and dust chamber.

7. A dust catcher comprising an inner chamber and a plurality of spiral outer chambers, means forming channels connecting the outer chambers, a gas outlet on the inner chamber, a gas inlet connected to the outer end of one of said spiral outer chambers, the inner end of said spiral chamber opening into said inner chamber.

8. A dust catcher comprising an inner chamber and spiral outer chambers surrounding said inner chambers, a gas outlet in the top of said inner chamber, a gas inlet to said inner chamber at one end of one spiral chamber, a gas outlet at the opposite end of said spiral chamber, and a series of baffles on the periphery of said spiral chambers forming vertical channels connecting said spiral chambers.

In testimony whereof, I have hereunto set my hand.

ARTHUR J. BOYNTON.

Witnesses:
H. W. INGERSOLL,
FLORENCE E. STETSON.

---

Copies of this patent may be obtained for five cents each, by addressing the "Commissioner of Patents, Washington, D. C."